United States Patent
Lüdi et al.

(10) Patent No.: US 10,675,709 B2
(45) Date of Patent: Jun. 9, 2020

(54) LASER PROCESS MONITORING

(71) Applicant: Bystronic Laser AG, Niederönz (CH)

(72) Inventors: Andreas Lüdi, Burgdorf (CH); Roland Bader, Rütschelen (CH)

(73) Assignee: BYSTRONIC LASER AG, Niederonz (CH)

( * ) Notice: Subject to any disclaimer, the term of this patent is extended or adjusted under 35 U.S.C. 154(b) by 603 days.

(21) Appl. No.: 15/331,226

(22) Filed: Oct. 21, 2016

(65) Prior Publication Data
US 2017/0113300 A1    Apr. 27, 2017

(30) Foreign Application Priority Data
Oct. 23, 2015 (EP) .................................... 15191289

(51) Int. Cl.
*B23K 26/02* (2014.01)
*B23K 26/38* (2014.01)
*B23K 26/03* (2006.01)
*B23K 31/12* (2006.01)
*B23K 31/00* (2006.01)
*B23K 26/06* (2014.01)

(52) U.S. Cl.
CPC ........ *B23K 26/032* (2013.01); *B23K 26/0626* (2013.01); *B23K 26/38* (2013.01); *B23K 31/00* (2013.01); *B23K 31/125* (2013.01)

(58) Field of Classification Search
CPC .............. B23K 26/02–0344; B23K 26/38–389
See application file for complete search history.

(56) References Cited

U.S. PATENT DOCUMENTS

| 7,863,544 B2 * | 1/2011 | Serruys | B23K 26/032 |
| | | | 219/121.83 |
| 9,452,544 B2 | 9/2016 | Zimmermann | |
| 2013/0178952 A1 * | 7/2013 | Wersborg | B23K 1/0056 |
| | | | 700/47 |
| 2013/0213943 A1 | 8/2013 | Takada | |

(Continued)

FOREIGN PATENT DOCUMENTS

| DE | 102010039525 A1 | 2/2012 |
| DE | 102011004117 A1 | 8/2012 |

(Continued)

*Primary Examiner* — Michael A Laflame, Jr.
(74) *Attorney, Agent, or Firm* — Jacob Eisenberg

(57) ABSTRACT

A method and a device for monitoring laser cutting processes in the high-power range above 1 kW mean output envisage automatic quality control after interruption and/or completion of a cutting process carried out with predetermined cutting parameters. The cutting process is interrupted after a first partial processing step, whereupon a partial section (K1 ... KX) of the processing path is scanned. This preferably takes place at a higher speed than that for the first partial processing procedure and preferably close to or on the same processing path. On the basis of the scan result at least one quality feature of the processing result is automatically determined and compared with predefined quality specifications. Depending on the result of the comparison a fault message can then be issued, the processing interrupted, reworking of a defect point carried out, at least one cutting parameter adjusted and the cutting process continued with the changed set of cutting parameters.

13 Claims, 4 Drawing Sheets

(56) References Cited

U.S. PATENT DOCUMENTS

2013/0327194 A1    12/2013   Zimmermann
2015/0185091 A1*   7/2015   Hasegawa ............ B23K 26/032
                                                     374/32
2017/0051386 A1*   2/2017   Carter ................... B22F 3/1055

FOREIGN PATENT DOCUMENTS

DE       112012005889 T5    11/2014
JP         2000158169 A     6/2000

* cited by examiner

LASER PROCESS MONITORING

CROSS-REFERENCE TO RELATED APPLICATIONS

This application claims priority to European Patent Application No. EP15191289.6, filed on Oct. 23, 2015, the entirety of which is incorporated herein by reference.

FIELD OF THE INVENTION

The invention relates to a method of monitoring laser cutting processes in the high-power range of over 1 kW mean output, wherein after interruption and/or completion of a cutting process carried out with predetermined cutting parameters automatic quality control is carried out in accordance with the disclosed embodiments, as well as to a high-performance laser cutting device with a device for determining at least one quality parameter of the processing result, comprising at least one detector system for recording radiation reflected from the scan area, or emitted, in particular, thermal radiation, and an evaluation unit connected thereto, as well as a control unit for the laser cutting device according to the disclosed embodiments.

More particularly the present invention relates to the monitoring of the laser cutting process through offline detection of quality features and/or quality defects. It is a new type of post-processing method which without partial removal immediately after processing, or intermittently during the processing, can measure and/or determine the quality of the produced parts or certain features thereof.

BACKGROUND

Because of the physical properties of online process monitoring, i.e. monitoring taking place in real time during the working process, in laser cutting it is often not possible to be able to measure the quality features of the processing result directly from the process emissions. In contrast to laser welding, where some quality features can be visualized directly from the melt pool and the resulting seam by means of camera images, in laser cutting, in particular, the quality of the cut surfaces for a coaxial detector device, e.g. a camera, arranged in the cutting head, are too greatly shortened or not visible at all, as the cut surfaces are perpendicular to the direction of observation. Therefore suitable characteristics must also be found from detector signals or camera images which correlate more or less reliably with the cutting quality features. The extent of the correlation can vary depending on the process state and sheet thickness, as a result of which the online assessment of the cutting quality is always subject to uncertainty.

Almost exclusively in-process or online methods have been published for laser material processing, in particular laser cutting. Hardly any post-process or offline methods of assessing the processing quality have been published. More particularly such post-process methods, which without partial removal immediately after processing, or intermittently with regard to the processing, can assess the component quality or certain features thereof.

For example, DE112012005889T5 discloses a very simple offline method in which test parts are cut at a certain location of the metal sheet before or during laser cutting. With a suitable sensor it is checked whether the test parts have fallen out. If so, the processing is started or continued, if not the processing is stopped. Similar procedures can also be found in other documents.

Thus, DE102011004117A1 discloses a method of monitoring laser-cut workpieces. After cutting a (small) inner contour or hole, the cutting head is positioned in the center in the cut contour at a distance from the cutting edge and through renewed irradiation with the working laser and by means of a simple detector in the inner contour or hole it is checked whether the waste part has fallen out or not. If no emissions occur during irradiation, the hole has fallen out. The actually cutting or piercing procedure is not interrupted.

A similar method is disclosed by DE102010039525A1 according to which checking for the presence of the waste part of the cut inner contour is carried out with the distance sensor of the cutting nozzle, wherein the current distance is compared with a known reference distance if necessary, Both methods are used for the quality control of perforated metal plates before these perforated metal plates undergo further processing stages.

JP2000158169A sets out a laser cutting machine with cutting process monitoring by way of a CCD camera wherein the camera recognizes the shape of remainder of the workpiece. A laser projector scans, along a zig-zag path for example, the entire area of the residual workpiece and the camera records the scanned beam of the entire processing area. The cut contour is not considered.

SUMMARY

The aim of the present invention is now to provide a method which does not have the aforementioned disadvantages of an online method or known post-process monitoring methods, as well as to provide a device in which these disadvantages do not occur during use. In particular, the method should not only to be usable for pinholes or components with small inner contours and also not reliant on the separate cutting of test parts, but to allow rapid direct measurement or determination of cutting quality features or quality defects of the parts to be produced immediately after or intermittently during processing.

To achieve this objective the method described in the introduction is characterized in that the cutting process is interrupted after a first partial processing step, that at least one partial section of the processing section cut during the first partial processing procedure, i.e. preferably along the cutting contour or within the kerf, is scanned, preferably at a higher speed than that of the laser cutting of the first partial processing procedure and preferably close to or on the same processing path, that depending on the scanning result at least one quality feature of the processing result is automatically determined and compared with predefined quality specifications and that depending on the result of the comparison at least one of the following measures is carried out: issuing of a fault message, discontinuation of the cutting process, adaptation of at least one of the cutting parameters, reworking of or more defect points, continuation of the cutting process, preferably with the changed set of cutting parameters. Compared with online process control, the offline method is characterized in that certain quality features such as slag residue, cutting edge roughness or kerf width are directly measured with a measuring method specially developed therefor following on from cutting without removal of the parts. In this way post-process quality control immediately after processing is possible and any quality defects can be determined without online monitoring and the processing can be either stopped or adjusted, and also reworked after this optimization. The relevant quality features can then be directly determined in an advantageous manner. At an appropriately high scanning speed nonproductive times can also be restricted to a minimum. A further advantage of this new method consists in the fact that compared with the methods of DE102010039525A1 and DE102011004117A1 any contours can be monitored, in particular also large external contours. The new method is also suitable for any workpieces and sheets of any thickness which per se have a less stable cutting process.

The determination of the quality feature(s) according to the invention is the equivalent of a measurement, and not, as in the prior part, just an indirect "digital" determination. For example, for the slag residue, after appropriate signal processing and calibration, the detector signal delivers a continuous value which corresponds with the level of slag residue in the kerf. In this way the magnitude of the quality defect can be directly seen, i.e. in the event of only very little slag residue there is no rejection and the cutting process can be continued without measures. In the event of much slag residue immediate rejection takes place and unwanted misalignment of the working points of the cutting process has to be implied. An adequate reaction can take place depending on the amount of slag residue. In particular, the type and manner of the cutting parameter adjustment can be determined by the control device on the basis of stored rules as a function of the detected amount of slag residue and/or length of the contour area over which the defect extends. One option of implementing such rules is, for example, fuzzy control.

An advantageous further development of this method is characterized in that for the cutting process at least at times an online process monitoring procedure is additionally carried out, wherein depending on the result of the comparison, if need be an adjustment of at least one monitoring parameter of the online process monitoring procedure, and/or continuation of the cutting process with the adjusted set of online monitoring parameters takes place.

Preferably after continuation of the cutting process, after a further partial processing procedure this is again interrupted, at least one partial section of the further partial processing section is scanned, preferably at a higher speed that for the further partial processing procedure, preferably on the same processing path, at least one quality feature of the processing result, preferably the same quality features as in the first partial processing section is automatically determined and compared with predefined quality specifications, and as a function of the result of the comparison at least one of the following measures is carried out: issuing of a defect report, discontinuation of the cutting process, adaptation of at least one of the cutting parameters, adjustment of at least one monitoring parameter of an online process monitoring system, continuation of the cutting process, preferably with the changed set of cutting parameters or with the adjusted set of online monitoring parameters.

A further preferred variant of the invention is characterized in that its processing procedures are carried out several times during the course of the cutting process, wherein the entire cutting process preferably comprises a complete cutting plan for a plurality of workpieces and each partial processing step maximally comprises the cutting plan for one of the workpieces, or at least a part of the cutting plan for one workpiece. Advantageously the degree of monitoring can be variably adjusted and the control device variably programmed. For example, for day-time operation manual monitoring by an operator can be envisaged and the offline process control switched off for this, whereas during the night shift the degree of offline monitoring is set to maximum and at least each part—if not partial sections within each part—is/are scanned.

Preferably the cutting process is interrupted after a partial processing section with a predetermined cutting length.

However, a preferred embodiment variant of the method according to the invention is characterized in that depending on the comparison of the at least one quality feature or quality defect, in particular kerf width, cut surface roughness and not completely cut through contour areas, as well as slag residue, with the quality specifications at least one of the cutting parameters such as, in particular, forward movement, laser power, focus position and cutting gas pressures is automatically adjusted.

The length of the partial processing section and/or of the scanned partial section thereof can also be selected as a function of changing properties of the laser cutting device or the geometry of the cutting path.

Preferably the number and/or the selection of the partial processing sections can be preselected, in particular in that the processing section is processed without the partial processing section or in that cutting process only has one partial processing section and/or that partial processing procedures are only carried out on a partial quantity of the processing sections.

A further advantageous embodiment variant of the invention envisages that in particular the first partial processing procedure and scanning procedure or the first group of partial processing procedures and scanning procedures take(s) place upstream of the actual processing procedure as a calibration and reference procedure, and depending on the results of the comparison of the measured quality features with the quality specifications for at least one cutting parameter its value is adjusted for the subsequent actual processing procedure, wherein preferably partial calibration procedures with different cutting parameter settings are carried out one after the other and/or within a partial processing procedure one or more cutting parameters are adjusted, wherein after the partial processing procedures the quality features are automatically determined and after the completion of the calibration procedure subsequent actual processing is carried out either with adjusted cutting parameters and/or adjusted monitoring parameters.

Yet another embodiment variant of the method according the invention is characterized in that at least one partial procedure of the cutting process is monitored by an online process monitoring method and a method according to at least one of the preceding paragraphs is activated and carried out as a function of the result of the online process monitoring method.

In this variant it can preferably be envisaged that at least one calibration procedure with changing cutting parameter settings is carried out and monitored by means of an online process monitoring method, wherein a concordance of the determined quality features of the processing result with the used cutting parameter settings and with characteristics of the signals of the online processing monitoring system is drawn up and stored for use in the latter.

A further form of embodiment of the invention is characterized in that a processing procedure is carried out with time-consecutive variations of several processing parameters and the processing procedure is regulated by way of a controllable process parameter as a function of at least one quality feature of the processing result, assessed by means of an online process-monitoring method and feedback from measurements from a method according to at least one of the preceding paragraphs relating to the same quality feature(s), wherein the method is used according to at least one of the preceding paragraphs on all the partial processing areas or preferably only on partial sections of the partial processing areas.

In this variant it can preferably be envisaged that algorithms of the online process monitoring method and their parameterization are continually adapted by preferably occasional feedback from the method according to at least one of the preceding paragraphs.

Through this interlinking of online and offline process monitoring the monitoring capability of the online system continually increases, as a result of which offline monitoring is required less often and unproductive times can thereby be shortened further. With increasing processing or cutting time on a machine, via offline process monitoring the system acquires increasing knowledge of the quality features of the cutting results, their correlation in online signals and relation to process parameters, through which adaptive monitoring and adaptive regulation are made possible. Through this the entire process security is increased. For a high-performance laser cutting device, with a device for determining at least one quality parameter of the processing result, comprising at least one detector system for recording radiation reflected from the scanning area or emitted, more particularly, thermal radiation and an evaluation unit connected thereto, as well as a control unit for the laser cutting device, the objective set out in the introduction is achieved in that the control unit and/or the evaluation unit is/are designed to implement a method according to any of the preceding paragraphs.

Preferably implemented in the control unit is a program that executes a method according to any of the preceding paragraphs.

It can preferably also be envisaged that the detector system comprises a system for contactless distance measuring, for example a laser distance sensor which is externally attached to the cutting head or is directly coaxially integrated into the beam path of the working laser beam, or a system for an imaging method, preferably a camera which is attached to the cutting head or its guide mechanism, but preferably coaxially integrated into the cutting head, a camera-based triangulation system, or at least a radiation-sensitive detector, for example a coaxially arranged photodiode.

An advantageous form of embodiment of the device is characterized in that the control unit is adapted to operate the working laser in a pulsed manner during the scanning procedure, wherein preferably the working laser is adjusted in terms of focus diameter in such a way that this is smaller than the kerf width and the focus position is set so that the working laser beam does not contact the cutting surfaces and that the detector system is adjusted to record the brief glowing of slag in the kerf.

The use of the working laser in pulsed operation for measuring slag residue (wherein 2-3 pulses are emitted per contour millimeter) and the calculation with suitable signal processing of the amount of slag residue from the pulsed glowing of the slag through detection of the emitted light, constitute a very advantageous embodiment of the invention in many respects. Firstly, no additional detectors are required, which keeps down the cost and complexity of the equipment needed. Secondly, the measurement does not have to be non-destructive (as when using a laser distance sensor) as slight modification of the slag during measurement is permitted. Thirdly, with the working laser beam a flexible laser source is already available. Through adapting the focus position in dependence on the sheet thickness even a simple coaxial detector can be used for measuring the amount of residue. Therefore, through utilising the special features of the object to be measured as well as the already present detector and light source element, optimal quality control can be implemented.

This device particularly preferably has a detector system comprises a camera, arranged in the laser cutting head, the observation direction of which in the propagation direction of the working laser beam at least after a focusing element closest to the processing zone extends obliquely to the optical axis of the laser cutting head, wherein the camera is preferably arranged eccentrically to its optical axis and can be guided via an eccentric at right angles to the current scanning direction thereof and wherein at least the distance between the camera axis and optical axis of the laser cutting head is variably adjustable, designed to record the cutting surface laterally in order to determine at least one quality parameter, more particularly a cut surface roughness.

A further variant of the device according to the invention is characterized in that the observation direction of the detector system in the direction of propagation of the working laser beam at least after a focusing element closest to the processing zone is aligned to the processing zone at a polar angle of greater than 5° relative to the optical axis of the working laser beam, preferably at a polar angle of greater than or equal to 7°, more particularly at a polar angle of approx. 10°.

It is of particular advantage if at least one detector system is provided, the observation direction of which is directed at the processing zone in an azimuth angle range of max. 45° to the direction of movement of the laser processing head, and contrary to its direction of movement.

Particularly preferred are several detector systems, preferably at least five, more particularly at least eight detector systems, which are preferably arranged evenly distributed along a circle that is coaxial and essentially perpendicular to the optical axis.

A further advantageous form of embodiment is characterized in that an illumination device for the detector system is present which comprises the working laser itself, an auxiliary laser or a pilot laser for the working laser.

A further solution to the objective set according the invention is provided by a computer program product, which after loading to the memory of the control device brings about a programmable laser processing device, in particular laser cutting device, with a system for determining at least one quality parameter of the processing result and the implementation of a method according to any of the above paragraphs.

BRIEF DESCRIPTION OF THE DRAWINGS

In the following description the invention will be explained in more detail by way of concrete examples of embodiment and with reference to the attached drawings.

In these

DESCRIPTION OF THE EMBODIMENTS

Due to the physical properties of offline process monitoring, such as observation of the process zone instead of the resulting cut surfaces, or due to the optically sharply reduced view of the process zone and the directly adjoining cut surface because of the, in parts, deep kerf, it is not—as already stated—possible to measure the quality features of the cut surfaces directly from the process emissions. Only the present method and the device envisaged therefor allow sufficiently precise and meaningful characterization of the kerf in order to assess the quality.

In contrast, the offline method according to the invention which is described below is characterized in that certain quality features of the cut parts are preferably measured even without their removal directly after or intermittently during the cutting process. Therefore in the event of poor cutting quality intervention in the process can already take place early on and not after completion of the process, through which waste is reduced or in the best case can be prevented entirely. The quality features or quality defects considered within the framework of the present invention could be: not completely cut through contour section, kerf width, cut edge roughness or, in particular, the slag residue occurring during laser thermal cutting. Slag residue is a particularly important quality parameter as it directly leads to parts rejection. For offline monitoring the laser cutting device interrupts the cutting process after at least a first section with a particular cutting length, at least regularly after processing sections with a particular cutting length, after the elapsing of particular time intervals or in accordance with other pre-determinable steps.

Figure 1:
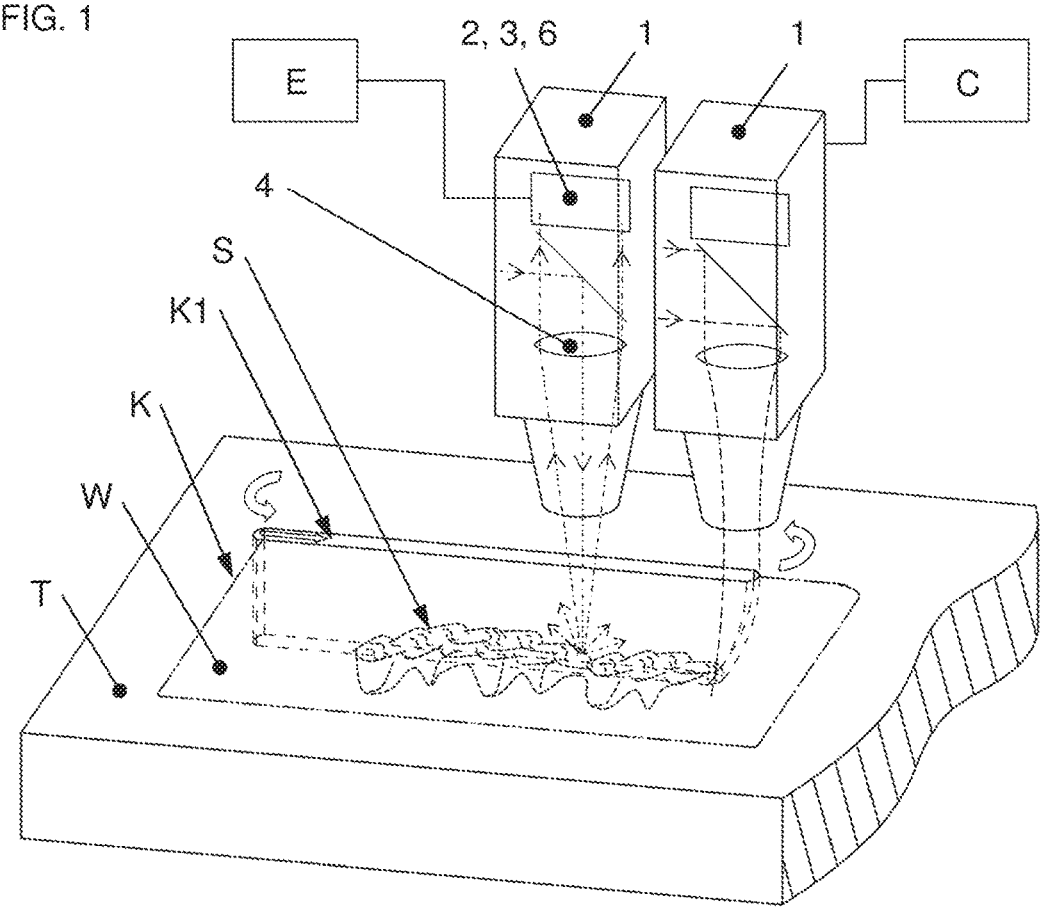
FIG. 1 schematically shows a first process step, a first section of a contour cut with a high-performance laser beam, with subsequent offline detection, e.g. of slag residue.

FIG. 1 shows this situation as an example for the quality defect slag residue S in the kerf. Here, after interrupting the laser cutting procedure, after cutting a first partial contour K1 of a complete cutting contour K of a workpiece W to be produced from a metal sheet T, the cutting head 1 again scans this partial contour K1. Preferably this scanning procedure takes place with a high advancing rate, i.e. at a higher speed than that during the cutting of the relevant part contour K1 so that not too much time is lost for quality control. The length of the sections to be scanned with offline detection must not be too long in order to prevent that the width of the kerf changes or even closes as a result of thermal expansion. The scanning procedure therefore typically takes place at a higher speed than the cutting process. Preferably, the cutting head 1, which as indicated in FIG. 1 also has an integrated or built-on detector system 2, 3, 6, travels the same processing path as during the cutting process or remains close to this path.

On the basis of the scan result in one evaluation direction E at least one quality feature of the processing result is automatically determined and compared with predefined quality specifications. For this and for all further described procedures, in the control unit C a program is implemented, preferably as instructions stored in a programmable memory in the form of a executable program.

If, through the scanning and evaluation procedure areas of poor cutting quality are detected in the section of the cut partial contour K1, the installation control unit C can stop the processing and/or issue a fault message. Alternatively or additionally one or more cutting parameters can be automatically adjusted, such as advancing, laser output, cutting gas pressure or the focus position. If during the scanning procedure non-severed contour areas are detected, subsequent cutting of these areas can also be carried out. Subsequently, the cutting process is preferably continued at the point of interruption, preferably with the adjusted set of cutting parameters. Interruption of the cutting process preferably takes place after a partial processing section, the length of which was predetermined before the start of the processing procedure.

Figure 2:
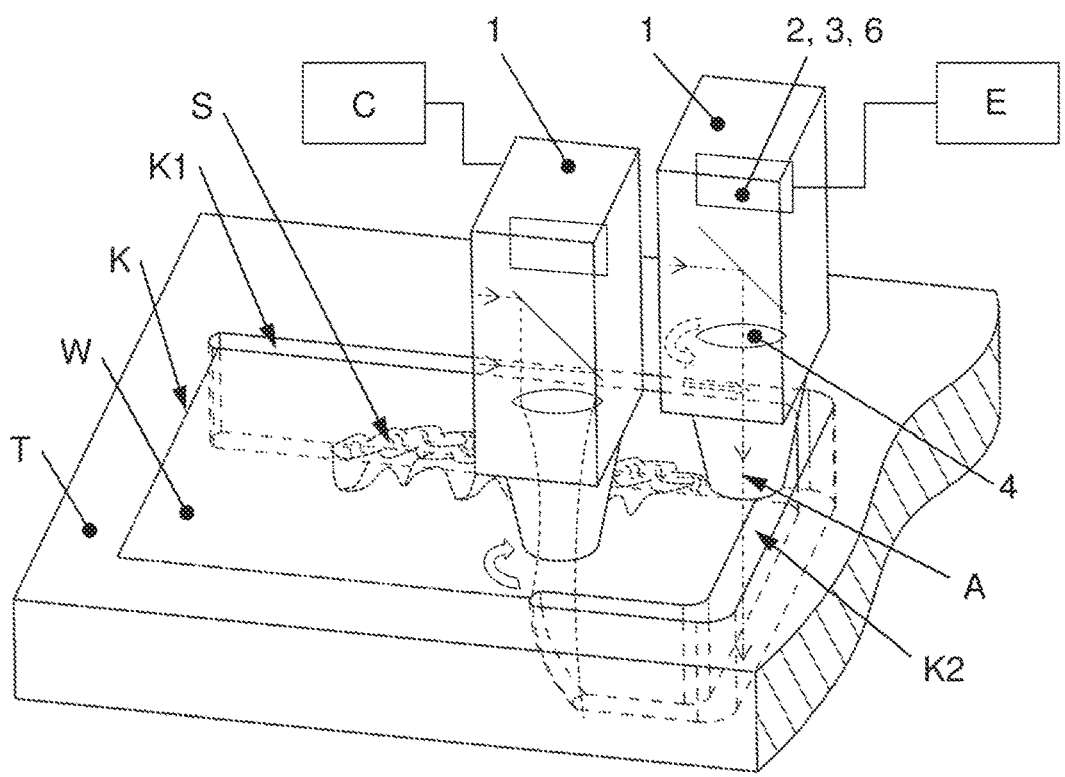
FIG. 2 shows a further process which after continuation of the contour cut comprises a further processing section, again with subsequent offline detection.

Preferably offline process monitoring is not only carried out once, but its steps can in principle be repeated as often as required or at least be repeated with varying frequency. The entire cutting process for partial contours K1 to KX can preferably comprise a complete cutting plan for a plurality of parts W to be cut out, and each partial processing procedure K1 to KX can in turn comprise as a maximum the cutting plan for one of these parts. Preferably, however, a part W or a contour K comprises several partial contours. After a further, second part of the cutting process, for example, the control units again interrupts the cutting process and the cutting head 1 with its detector system 2, 3, again scans the most recently cut contour piece K2, at least in a partial area thereof as shown schematically in FIG. 2. If areas with poor cutting quality are detected, the above measures, such as automatic adjustment of the cutting parameters, can be repeated. Once the problem has been rectified the contour K of the entire part W is cut out of the metal sheet T in this intermittent operation. The further cutting parts of the entire cutting plan on the metal sheet T are cut and scanned in the same intermittent operation.

The degree of monitoring can be adjusted. When set to a maximum all parts and contours are re-scanned, when set to "each-$^{th}$ part" every-$^{th}$ part is scanned or only the first parts of metal sheet are checked and random checking sequence selected. A further possibility, which is particularly advantageous in connection with an online process monitoring system, consists in selecting the length of the partial contours KX to be large, and only scanning short sections directly at the end of the partial contours.

The length of the partial processing sections K1, K2 and/or of the scanned partial section thereof can also be selected as a function of changing properties of the laser cutting device, such as the absorption of the protective glass or the focusing lens or the working laser beam or the geometry of the cutting path. For this, certain monitoring parameters of the laser cutting machine are evaluated by the evaluation unit E and taken into account depending on the relevance for the quality of the cutting process. The cutting plan can also be evaluated and sections identified in which quality problems typically occur, which can then preferably be selected for the monitoring scan.

The detector or sensor system 2, 3, 6 preferably comprises a system of contactless distance measuring, for example a laser distance sensor which is externally attached on the cutting head 1 or preferably directly coaxially integrated into the beam path of the working laser beam. The laser distance sensor already known for other applications is preferably suited for depth measurements in the case of narrow shaft conditions.

Alternatively, a radiation-sensitive sensor device, for example a coaxially arranged photodiode 2 can be used as the detector system. During the scanning procedure the kerf must be illuminated, either directly with the working laser beam operating at low power, or with its pilot laser, or with any other illumination device placed in the beam path or in the cutting head 1 and preferably has a spot diameter in the region of the kerf width. If slag residue S is present in the kerf distinct reflections can be measured at the sensor of the detector system 2, 3, 6 and the slag residue can thus be precisely localized on the previously cut kerf. As the actual detector, a device for an imaging method can be used, preferably a camera 3 which is attached on the cutting head or its guide mechanism, but is preferably integrated into the cutting head. In addition to slag residue, these also allow measurement of the kerf width d and scoring structure or roughness R on the upper cut edge. A further alternative is a camera-based triangulation system with which the amount of any slag residue, unilateral adhesion of slag on a cut edge, the kerf width d and cut edge offset can be directly measured. So that the method functions for any contour cuts, the laser line is always turned orthogonally to the kerf.

A preferred embodiment of the invention is to be scanned in a pulsed manner with the working laser beam, wherein if slag S is present in the kerf it glows briefly so that a distinct signal can be recorded via the detector 2, 3, 6. During the pulsed scanning the working laser is preferably adjusted in terms of focus diameter in such a way that this is smaller than the kerf width and the focus position is set so that the working laser beam does not contact the cut surfaces.

Figure 3:
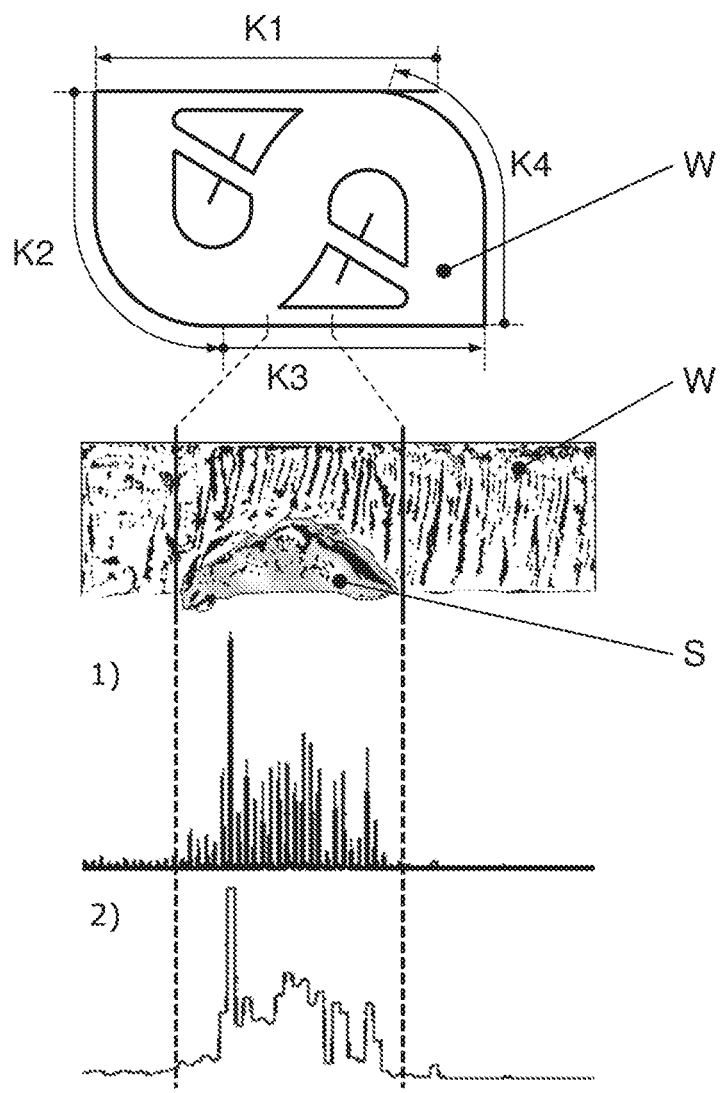
FIG. 3 is an illustration to explain offline detection of slag residue by means of laser pulses and resulting process lights.

FIG. 3 shows the measurement of the slag residue on an extreme example of process interruption during the laser cutting of thick steel. The partial contours K1 and K2 have already been cut and scanned in pulsed operation, wherein no quality defects were found. After cutting partial contour K3 this too was pulse-scanned in order to detect any glowing with the detector 2, 3, 6. The detector signals clearly shows that a very strong but fairly short process interruption has taken place. The defective point can be very precisely localized on the partial contour K3. Additionally, both the raw detector signals (area 1) and also the pulse-processed signals (area 2) clearly show the extent of the slag S or welding as function of the position on the partial contour. For subsequent processing the possibilities already set out above are available: 1. reworking of the defective point or 2. discontinuation of the cutting process or 3. further processing of a subsequent partial contour K4, preferably with the adjusted set of cutting parameters. In certain applications, e.g. in plant manufacturing or in shipbuilding very large components are cut from thick steel sheets. If the components have sections with, for example, sharp corners or rather narrow inner contours, in certain circumstance welding can occur in these contour areas. With the offline method according to the invention these sections can be identified, re-cut or reworked in another way, thereby avoiding costly waste.

Particularly advantageous is the use of detector systems 3, 6 with non-coaxial detectors, i.e. with directions of observation of the process zone or the section of the cut contour K to be scanned obliquely inclined relative to the optical axis A. In this way the level of the slag residue A in the kerf can be determined particularly easily. This information is important in order to be able to rule out pseudo faults due to cutting rust, or in order to be able to trigger suitable automatic adjustment of the cutting parameters. If a non-coaxial camera system 3 is used as the detector system either the right or the left cut surface can be depicted. In spite of the very shortened depiction of the vertical cut surface it is possible to be able to calculate a measure of the roughness R in the upper area of the cut edge from the grey scale variations in the camera image.

Figure 4A:
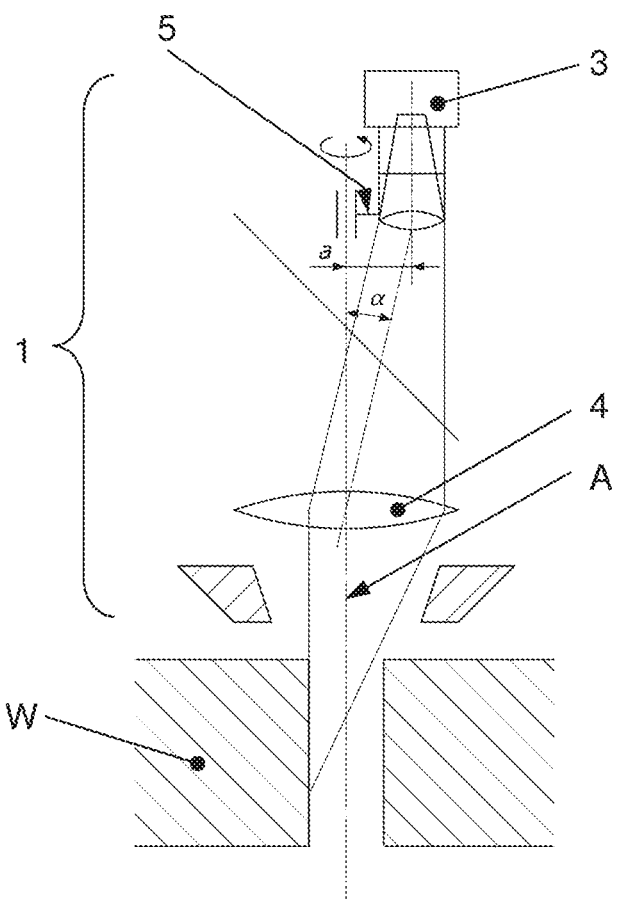
FIG. 4a shows as an example an eccentrically arranged camera for the offline detection of the roughness of a cut part, FIG. 4b schematically shows a side view of the kerf illustrating the roughness as the quality-determining property.
Figure 4B:
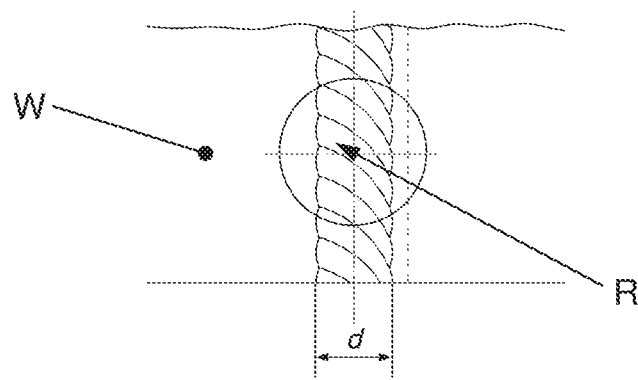

In connection with this, one form of embodiment of the invention, which is shown in FIG. 4 for example, envisages that the detector system comprises a camera 3, arranged in the laser cutting head 1, the observation direction of which α extends in the propagation direction of the working laser beam, at least behind a focussing element 4 closest to the processing zone, obliquely to the optical axis of the laser cutting head 1. Preferably the camera is arranged eccentrically to the optical axis A of the working laser beam. A further advantageous further development consists in the camera 3 being guided via an eccentric 5 at right angles to the current scanning direction, wherein at least the distance a between the camera axis and optical axis A of the laser cutting head 1 is variably adjustable. The cut surface of the relevant scanned contour K1, K2 can thereby be laterally recorded in every cutting direction in order to determine at least one quality parameter, more particularly a cut surface roughness R. However, it is also conceivable that the detector system 3 is mounted on the processing axes on the cutting trolley of the laser cutting system.

Additionally, for correcting imaging errors, the camera axis can be slightly inclined.

Figure 5:
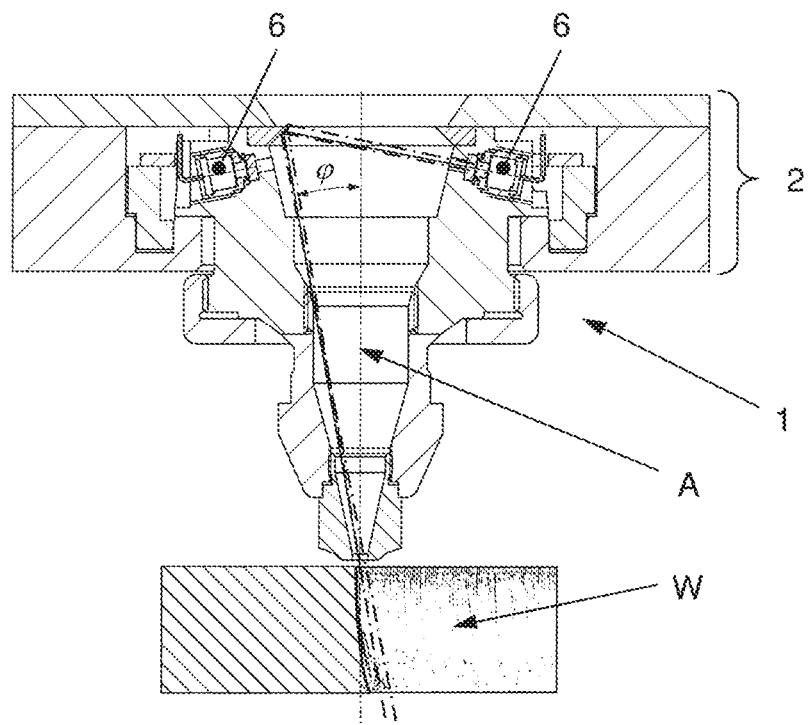
FIG. 5 shows an example of detector construction for non-coaxial observation with cone mirrors and eight photodetectors distributed on the circumference.

To detect slag residue S in the kerf and the level thereof, decisive advantages result if a system of sensors, particularly photodiodes 6 is used as the detector system or an essential part thereof, which allows observation with a direction of observation which is not coaxial to the working laser beam. As shown in FIG. 5, the observation direction of the photodiodes 6, is preferably aligned to the processing zone in the direction of propagation of the working laser beam at least after a focusing element 4, in particular a focusing lens, closest to the processing zone at a polar angle φ of greater than 5° relative to the optical axis A of the working laser beam. Preferably this polar angle φ is greater than or equal to 7°, in particular approximately 10°. For the optimal detection of slag residues and not severed contour sections a further preferred variant envisages that the observation direction of the detector system 6 is aligned in a region of an azimuth angle of maximum 45° to the direction of movement of the laser processing head 1 and contrary to the direction of movement of the cutting process on the processing zone, i.e. the just cut contour K1, K2.

Instead of a specific alignment of the detector system 2, 3, 6 in a direction determined, for example, by the scanning and cutting direction, an adequate view in all possible advancing directions can also be achieved through several detector systems preferably arranged evenly distributed along a circle coaxial and essentially at right angles to an optical axis A of the working laser beam and advantageously looking via a deflection mirror, here a conical mirror, integrated in the detector system 2 at the processing and scanning area. At least five, depending on the detector dimensions and distance from the zone to be scanned, more particularly at least eight detector systems or individual photodiodes 6 on a joint detector system are required.

Particularly advantageous approaches to the process monitoring of a laser cutting procedure can be brought about through a combination of the previously described method and the described devices together with online monitoring methods.

Figure 6:
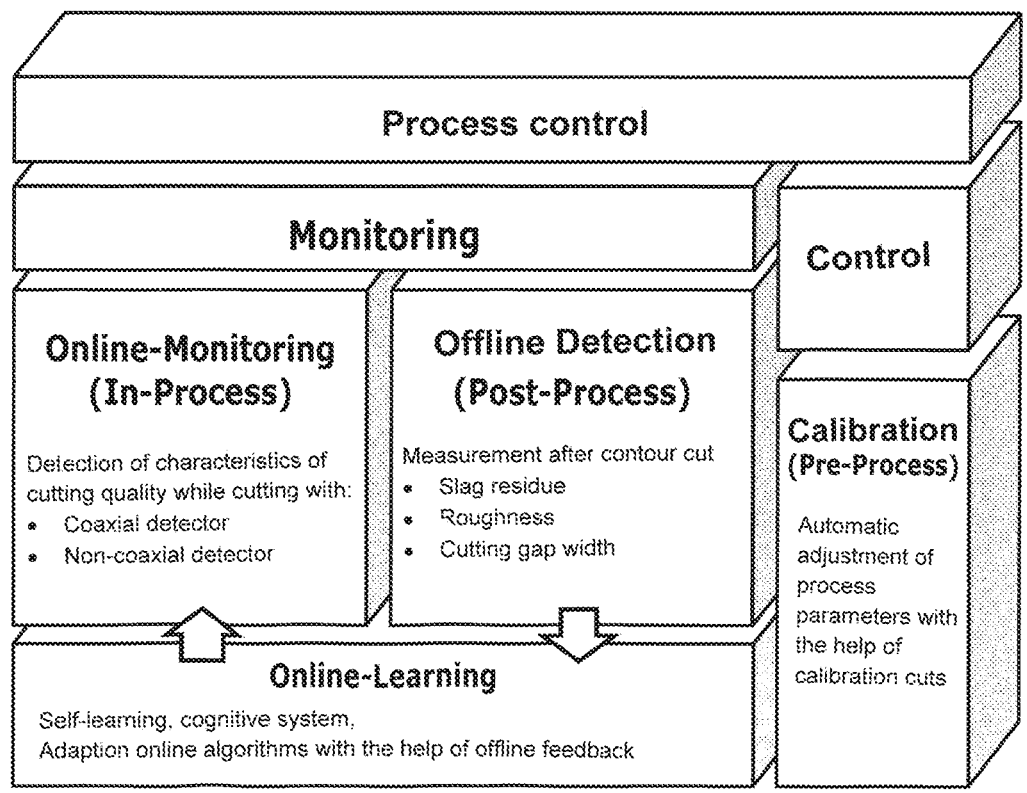
FIG. 6 shows a schematic diagram of various possibilities of system integration of online and offline systems for self-learning, cognitive process monitoring.

As an integrated system, as shown in the diagram in FIG. 6, these expand the online and also offline systems into a self-learning cognitive process monitoring system.

In their basic form online systems calculate various characteristics from detector signals, from which one or more quality features are estimated. In this context estimation should be interpreted in a statistical sense, wherein the input parameters or measurements are also subject to uncertainty. Using statistical or stochastic models and suitable estimation methods such as least squares or maximum likelihood, optimal output or target variables are estimated taking into account information on uncertainty.

Some embodiments of the integration of both systems are described as examples below. The simplest form of embodiment according to the invention is a method with the aforementioned offline monitoring, in which for the cutting process an online processing monitoring method is also implemented at least at times. Depending on the result of the comparison on the basis of the scan result, in which at least one quality feature of the processing result is automatically determined and compared with predefined quality specifications, the use of at least one monitoring parameter of the online process monitoring system and/or continuation of the cutting process with the adjusted online monitoring parameter set as a result of the offline monitoring can be envisaged. Instead of a firmly predetermined offline process monitoring sequence, implementation triggered by certain events can also be envisaged, in which one variant of embodiment of the offline method according to the invention is triggered or implemented as a function of a quality defect which is estimated or detected by way of an online process monitoring method but whose presence is associated with uncertainty. For example, the degree of offline monitoring can be set to the option "in the case of increased probability of slag formation". With this, following indication by the online monitoring system, offline detection is triggered. The online monitoring diagnosis which is subject to uncertainty can thus be verified. Pseudo errors are also ruled out in this way.

An advantageous further development of the integration of offline and online methods in the direction of a self-learning method can be achieved if the algorithms of the online process monitoring method and their parameterization are continuously adjusted with the help of the preferably occasional feedback from the evaluation of the scanning procedures of the offline method and in this way the degree of separation between good and poor cutting quality is increased and fault classification rates are reduced. Suitable algorithms for this come from the domain of machine learning and artificial intelligence. These include supervised learning, which can be implemented with, for example, artificial neuronal networks. Particularly suitable for use with occasional feedback are methods for weakly supervised learning or semi-supervised learning. An example of this is so-called reinforcement learning.

The forms of embodiment of the offline processing monitoring system according to the invention can also be advantageously used for calibration procedures which are carried out prior to processing or which are regularly repeated during processing. Calibration cuts can be carried out with various processing parameter settings, wherein, for example, the focus position and advancing speed can be automatically varied in accordance with a suitable algorithm. Subsequent to, or intermittently in relation to processing, the slag residue or another quality feature is recorded with the offline method. In this way good and bad settings of the processing parameters can be determined and the associated characteristics from the online system signals stored. In particular, for calibration or as a reference procedure, the first partial processing procedure and scanning procedure or the first group of partial processing procedures and scanning procedure precede an actual processing step. Depending on the result of the comparison with the quality specifications of the quality features measured offline, the value of at least one cutting parameter is adjusted for the following, actual, processing step. Particularly good adjustment for the actual laser cutting procedure can be achieved by carrying out several partial calibration procedures with different cutting parameter settings, or also if within one partial calibration procedure one or more cutting parameters are changed, wherein each time after the partial processing steps the quality features are automatically determined, and the actual processing following the completion of the calibration procedure is carried out either with adjusted cutting parameters and/or adjusted monitoring parameters. The parameter variations can be undertaken according to known optimization algorithms, for example Newton's gradient method or also optimization methods from statistical experiment planning (design of experiment), e.g. a central composite test plan The calibration cuts can be carried out automatically, e.g. at the start of a production batch. In the case of laser cutting installations this is preferably at the start of the processing of a new metal sheet. However, calibration cuts can also be automatically triggered during the processing or manually by the operator. This is advisable in the case of changed environmental influences which cannot or are only difficult to amend, e.g. increased protective glass absorption, ageing and contamination of the processing nozzle etc.

A further advantageous form of the method is made possible if the metal sheet is processed with prior separating cuts. The separating cuts can be carried out directly as calibration cuts. It must be ensured in the case of the separating cuts that no too great quality defects occur as a result of process parameter variations.

A further advantageous embodiment of the method is to position the calibration cuts on the metal sheet during nesting in such a way that no additional waste occurs. For this the calibration cuts must be automatically applied by the nesting software in areas of the waste sheet or residual grid.

A further advantageous form of the method is to carry out calibration cuts not only at the start of a metal sheet, but to repeat them again and again after a certain number of parts or cut metres. In this way drifting of the cutting quality can be detected and easily corrected. With the help of a suitable optimization algorithm it can be assured that in terms of the quality parameters cutting always takes place with optimum process parameters.

A further advantageous form of the method is to carry out calibrations when a quality defect is detected on a cut part with the originally disclosed offline method. Through this the process parameters can be optimally readjusted.

Another embodiment of the method is the concept of transferring calibration cuts to the target parts themselves. However, a precondition for this is that no serious quality defects are produced. The parts to be produced are cut with automatic parameter variations and scanned in accordance with the originally disclosed offline method. In this way it can be assured without calibration cuts that in terms of the quality parameters cutting always takes place with optimum process parameters.

Calibration can, however, also be helpful in order to improve an online process monitoring method in that a calibration procedure is carried out with changing cutting parameters settings monitored by means of an online process monitoring method. In doing so a concordance with the varied cutting parameter settings, the quality features of the processing results determined with the offline method and with the associated characteristics of the online process monitoring system signal is advantageously drawn up. This concordance is stored in the control device. With aid of the offline feedback it is therefore possible for the system to automatically learn not yet occurred states of the processing process and thereby hitherto unknown forms of the signal characteristics of the online system and to regulate the cutting process.

Another variant envisages that a processing procedure is carried out with time-consecutive variations of several processing parameters and the processing procedure is regulated depending on at least one quality feature of the processing result assessed by means of an online process monitoring method and feedback from measurements from one of the offline process monitoring methods according to the invention relating to the same quality feature(s) by way of the controllable process parameters. The offline method can be used on all the partial processing areas or preferably only on partial sections of the partial processing areas. An advantageous embodiment of the invention expands the calibration cut concept to form a self-calibrating regulated system in that slight parameter variations of several processing parameter are carried out simultaneously during the processing. The processing status is then regulated on the basis of the process response in the detector signals and sporadic feedback of the offline system with the aid of controllable process parameters. Due to the physical aspects, in accordance with which in the detector signals information on the processing quality and information on the processing status not yet visible in the processing result overlap, regulation of the processing quality is possible within a tolerance range.

Part of the invention is also a computer program product, which after loading into the memory of the control device of a programmable laser processing device, in particular a laser cutting installation with a device for determining at least one quality parameter of the processing result, implements the above-described method.

LIST OF REFERENCES

Cutting head 1
Detector system 2
Camera 3
Focussing element 4
Eccentric 5
Photodiodes 6
Optical axis A
Control unit C
Kerf width d
Evaluation device E
Cutting contour K
Partial contour K1, K2 . . . KX
Roughness R
Slag residue S
Metal sheet T
Workpiece W
Direction of observation α, φ

The invention claimed is:

1. A method of monitoring laser cutting processes in the high-power range above 1 kW mean output, wherein after interruption and/or completion of a cutting process carried out with predetermined cutting parameters quality control is automatically carried out, wherein the cutting process is interrupted after a first partial processing step, wherein at least a partial section (K1, . . . KX) of the processing section cut during the first partial processing step is scanned at a higher speed than that of the laser cutting of the first partial processing step and f>H'>h'>frJ3+y close to or on the same processing path, wherein on the basis of the scan result at least one quality feature of the processing result is determined and compared with predefined quality specifications, wherein quality characteristic comprises a slag residue (S) in a cutting gap on the machining path, a cutting gap width and a cutting gap roughness, and compared with predefined quality standards, wherein depending on the result of the comparison one of the following measures is carried out: issuing of a fault message, discontinuation of the cutting process, adaptation of at least one of the cutting parameters, reworking of one or more defect points, continuation of the cutting process, with the changed set of cutting parameters.

2. The method according to claim 1, wherein for the cutting process at least at times an online process monitoring procedure is additionally carried out, wherein depending on the result of the comparison, if need be an adjustment of at least one monitoring parameter of the on-line process monitoring procedure and/or continuation of the cutting process with the adjusted set of on-line monitoring parameters takes place.

3. The method according to claim 1, wherein after continuation of the cutting process this is again interrupted after a further partial processing step (K2 . . . KX), at least a partial section of the further processing section is scanned at a higher speed than that of the laser cutting of the further partial processing step and close to or on the same processing path,
wherein during this at least one quality feature of the processing result is automatically determined and compared with predefined quality specifications, and
wherein depending on the result of the comparison at least one of the following measures is carried out: issuing of a fault message, discontinuation of the cutting process, adaptation of at least one of the cutting parameters, adjustment of at least one monitoring parameter of an online process monitoring system, reworking of one or more defect points, continuation of the cutting process, with the changed set of cutting parameters or with the adjusted set of online monitoring parameters.

4. The method according to claim 1, wherein the processing steps are carried out several times during the course of the cutting process, wherein the entire cutting process, wherein the entire cutting process comprises a complete cutting plan for a plurality of workpieces (W) and each partial processing step maximally the cutting plan for one of the workpieces (W), or at least a part of the cutting plan for one workpiece.

5. The method according to claim 1, wherein the interruption of the cutting process takes place after a partial processing section (K1 . . . KX) with a predetermined cutting length.

6. The method according to claim 5, wherein depending on the comparison of the at least one quality feature or quality defect, in particular kerf width (d), cutting surface roughness (R) and not completely cut through contour areas, as well as slag residue (S) with the quality specifications at least one of the cutting parameters selected from forward movement, laser power, focus position and cutting gas pressures is automatically adjusted.

7. The method according to claim 5, wherein the length of the partial processing section (K1 . . . KX) and/or of the scanned partial section thereof is selected as a function of changing properties of the laser cutting device or the geometry of the cutting path.

8. The method according to claim 1, wherein the number and/or the selection of the partial processing sections (K1 . . . KX) can be preselected, wherein the processing section (K) is processed without the partial processing section or wherein cutting process (K) only has one partial processing section and/or wherein partial processing procedures are only carried out on a partial quantity of the processing sections (K) or workpieces (W).

9. The method according to claim 1, wherein the first partial processing step and scanning procedure or the first group of partial processing procedures and scanning procedures take(s) place upstream of the actual processing procedure as a calibration and reference step and depending on the results of the comparison of the measured quality features with the quality specifications for at least one cutting parameter its value is adjusted for the subsequent actual processing procedure, wherein partial calibration procedures with different cutting parameter settings are carried out one after the other and/or within a partial processing procedure one or more cutting parameters are adjusted, wherein after the partial processing procedures the quality features are automatically determined and after the completion of the calibration procedure subsequent actual process is carried out either with adjusted cutting parameters and/or adjusted monitoring parameters.

10. The method according to claim 1, wherein at least one partial procedure of the cutting process is monitored by an online processing monitoring method and wherein the method of monitoring laser cutting processes is triggered and carried out as a function of the result of the online process monitoring method.

11. The method according to claim 9, wherein at least one calibration procedure with changing cutting parameter settings is carried out and monitored by means of an online process monitoring method, wherein a concordance of the determined quality features of the processing result with the used cutting parameter settings and with characteristics of the signals of the online processing monitoring system is drawn up and stored for use in the latter.

12. The method according to claim 1, wherein a processing procedure is carried out with time-consecutive variations of several processing parameters and the processing procedure is regulated by way of a controllable process parameter as a function of at least one quality feature of the processing results assessed by means of an online process-monitoring method and feedback from the measurements relating to the same quality feature(s), wherein the method is used on all the partial processing areas or only on partial sections of the partial processing areas.

13. The method according to claim 12, wherein algorithms of the online process monitoring method and their parameterization are continually adapted by occasional feedback.

* * * * *